United States Patent Office 2,963,937
Patented Dec. 13, 1960

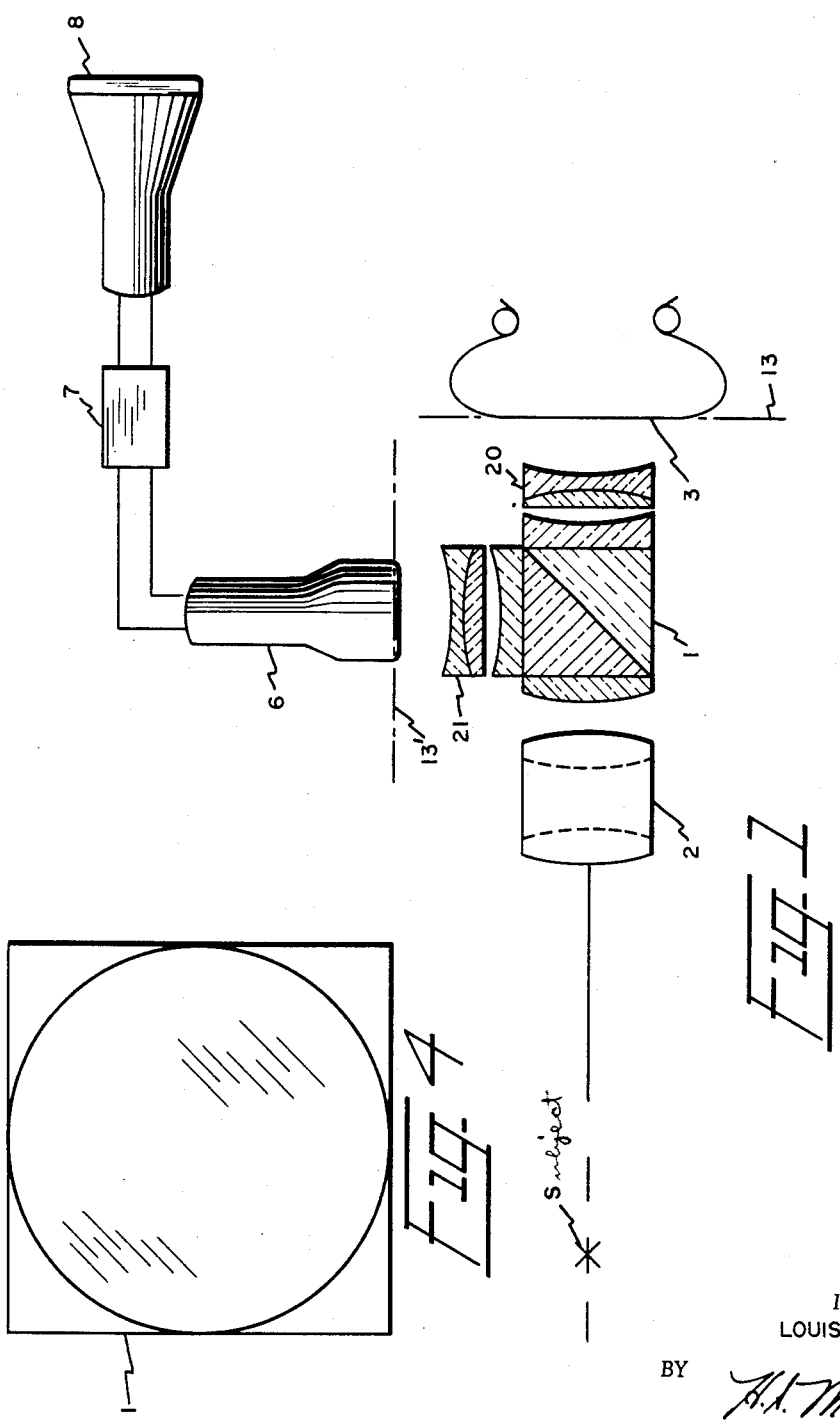

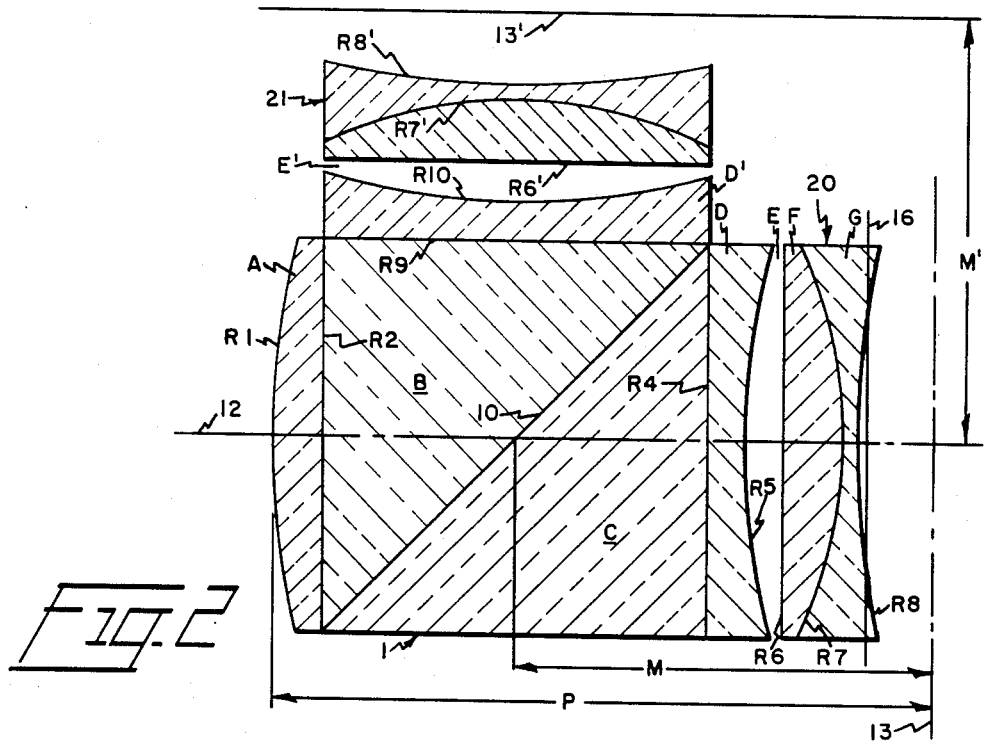
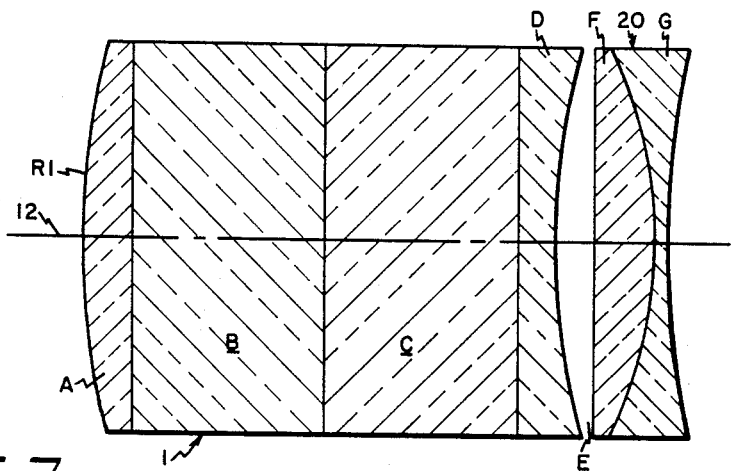

2,963,937

OPTICAL BEAM SPLITTER

Louis Pierre Raitiere, Pleasantville, N.Y., assignor to General Precision, Inc., a corporation of Delaware Filed Sept. 29, 1958, Ser. No. 764,124

5 Claims. (Cl. 88—1)

This invention relates to an improved optical system for dividing a beam of light into two separate beams and is a continuation in part of my copending application Serial No. 631,838 filed December 31, 1956, and now abandoned. More specifically this invention provides improved means for dividing the rays of an image-bearing light beam into two separate beams with a minimum of disturbance of the relation between the light rays so that two substantially identical undistorted images can be produced at the same time. The invention is adapted to use with a conventional objective system for producing simultaneously substantially identical images on two different media, such as the film in a motion picture camera and a television pickup apparatus which may be used for monitoring or transmission.

In conventional beam-splitters, such as those using half-silvered mirrors, double images are produced in both the direct light path as well as in the reflected light path due to the double reflection from the two surfaces of the mirror. In others, using prism surfaces, the double image defect is not present, but for other than parallel light rays excessive optical aberrations are present.

Because the present invention has made it possible to correct these usual aberrations in beam-splitters using prisms, the invention is particularly adapted as an attachment in a standard motion picture camera so that identical images may be formed simultaneously on the motion picture film and on a viewing screen, a video pickup device or the like. The invention resides in providing a split cube beam-splitter in combination with a doublet for correcting spherical aberration, coma, chromatic aberration, astigmatism and field curvature in converging or diverging light beams.

The primary object of the invention is to provide an improved compact device for splitting a beam of light into two beams having substantially no aberrations.

A further object is to provide a split cube having correcting surfaces incorporated thereon into a partially self-compensating unit which can be used with very simple additional optical components for splitting an image-bearing light beam to form two substantially identical images having no substantial aberrations.

Other objects and a complete understanding of this invention may be secured from the following detailed description when considered in connection with the accompanying drawings, in which:

Figure 1 is a cross-sectional and diagrammatic illustration of one adaptation of the invention;

Figure 2 is a vertical cross-section through the axis of an optical system embodying the invention;

Figure 3 is a horizontal cross-section through the axis of the optical system; and Figure 4 is a side view typical of the incident and emergent surfaces of the lens elements cemented to the faces of the split cube.

The invention is illustrated in Fig. 1 in a system for simultaneously filming a scene and providing an identical image for video monitor or transmitter. A split cube 1 is shown disposed between a camera objective system 2 and a motion picture film 3. No details of the camera mechanism are shown since they can be of conventional construction. The split cube 1 transmits some of the image-bearing light rays from the object indicated at S, directly to the film 3 and simultaneously reflects a substantially identical image onto a video pickup tube 6. The output of the video pickup tube 6 is amplified in an amplifier 7 from which it can be supplied to a video monitor 8. Obviously the output of the amplifier 7 could be supplied to a conventional television transmitter.

It is well known that when a thick plano-parallel piece of glass is used across a converging light beam there are serious optical aberrations. Therefore, it is usual practice to use with such devices separate complicated optical systems to correct these aberrations. In accordance with the present invention it has been found that this optical correction system can be greatly simplified and can be made very effective in a very short optical path by effectively bending or warping the faces of the cube toward the incident light.

This warping of the surfaces is so effective that the modified cube and a simple doublet can be placed between the objective of the conventional motion picture camera and the film strip and still have the focal plane well within the range of adjustment of the objective. This adaptation of the invention is chosen for purposes of illustration as shown in Fig. 1.

Referring to Fig. 2, the split cube 1 comprises two right triangular prism sections B and C cemented together at an interface junction plane 10. At this junction plane between these two sloping faces of the prism sections B and C there is a suitable substance of a type well known in the art, for controlling the ratio of the transmitted to the reflected light. The ratio of the light transmitted to that reflected is not pertinent to this invention so long as there is sufficient light reflected to produce an operable reflected image at the video pickup tube 6.

Three faces of the cube 1 are effectively bent or warped toward the incident light by having a plano-convex lens element A cemented to the incident face $R_2$ and two plano-concave lens elements D and D' cemented, respectively, to the emergent faces $R_4$ and $R_9$ of the cube. The lens element A has an outer convex surface $R_1$ which has the same radius of curvature as the concave outer surface $R_5$ of the lens element D and the concave outer surface $R_{10}$ of the element D'. The lens elements D and D' are identical in all respects.

The element A, the prism sections B and C and the lens element D are symmetrical about the optical axis 12 in both the vertical and horizontal planes as shown, respectively, in Figs. 2 and 3. Likewise, the lens element D' is symmetrical about an axis normal to and intersecting the axis 12 at the center of the plane of juncture 10 between the prism sections B and C.

In this beam splitting system all of the aberrations of the system affecting the directly transmitted light must be corrected in the space between the objective system 2 and the film strip 3. Likewise, all of the aberrations of the system affecting the reflected image must be corrected in the space between objective 2 and the reflected image plane on the video pickup tube 6. The effective warping of the incident and emergent surfaces of the split cube described above substantially eliminates the astigmatism for all practical purposes and in combination with simple negative doublets 20 and 21, which have negative powers between —0.1 and —0.4 diopters, substantially eliminates all of the other aberrations. The correction of chromatic aberration is effected in a conventional manner by making the glass of the lens elements A, D and D' of the same composition and having approximately the same index of refraction for yellow light but the element A having a substantially lower Abbe number, or index of dispersion.

To this end, thin negative doublet lenses 20 and 21 are placed in the emergent beams adjacent to the respective surfaces $R_5$ and $R_{10}$. These negative lenses are identical and therefore only one need be described. Referring to lens 20, this is a doublet consisting of a plano-convex element F cemented to a double concave element G. The plane surface $R_6$ of element F faces the concave surface $R_5$ of the element D and is separated therefrom by an air space E. The element G has its concave incident surface $R_7$ facing the surface $R_5$ with its outer concave surface $R_8$ on the emergent side. The compound lens element 21 has corresponding surfaces $R_6'$, $R_7'$ and $R_8'$. The surface $R_6'$ is separated from the surface $R_{10}$ by an air space E' corresponding in thickness to the air space E.

Image-bearing light rays from a subject S are directed by the camera lens objective 2 to the incident surface $R_1$ of the lens element A of the split cube 1 and an image is formed at the direct image plane 13 where the film 3 is located. This image plane 13 is at a distance P from the apex of the incident surface $R_1$ and at a distance M from the center of the plane of juncture 10. Similarly, the juncture surface 10 reflects some of the light onto the reflected image plane 13' which is at a distance M' from the center of the juncture surface 10. The distances M and M' are equal. The focal plane of the taking or objective lens system 2 normally would be at the plane indicated by the numeral 16 if the modified split cube 1 and the negative lens 20 were not present. The ratio of the radius of curvature of both the incident and emergent surfaces of the cube to the distance P must be maintained at 3±15% to insure proper operation of the device.

Although the warped or bent surfaces on the cube 1 have been described as being provided by cementing separate lens elements to the faces of the split cube because this is the most convenient and cheapest, it should be clearly understood that if desired emergent surfaces $R_5$ and $R_{10}$ may be formed directly on the faces of the cube 1. Also for convenience and reduced cost the lenses A, D and D' are made from conventional circular blanks as indicated in Fig. 4. These blanks could be fused instead of being cemented to the prism sections B and C.

In accordance with this invention the radii of curvature of the surface $R_1$, $R_5$ and $R_{10}$ are related to the negative doublets 20 and 21 in a special way so as to substantially eliminate all aberrations. The bending of the incident and emergent surfaces of the cube tends to reduce all the aberrations and for a given bending substantially all of the spherical aberrations could be eliminated for small angles of field. However, as is well known, for large angles of field, such as those required in a camera the necessary bending to eliminate astigmatism will produce substantial residual spherical aberration. It has been found, however, in accordance with this invention that if negative lenses, such as the chromatically corrected doublets 20 and 21, are located close to the focal planes 13 and 13', the effect of the bending of the incident and emergent surfaces $R_1$, $R_5$ and $_{10}$ upon the astigmatism will be substantially reduced. Accordingly, the radius of curvature of these surfaces is chosen, that is the surfaces are bent so as to substantially eliminate spherical aberration. Then the doublets 20 and 21, are given such power, that is, the radii of curvature of the surfaces $R_8$ and $R_8'$, respectively are so chosen and the value of the index of refraction of the glass is so chosen as to substantially cancel the positive astigmatism resulting from the bending of the split cube surfaces.

In the preferred embodiment of the invention, the prism sections B and C of the split cube 1 and the lenses D and D' are made of the same kind of glass having identical refractive indices and Abbe numbers. The lens A is made of glass having substantially the same index of refraction as the glass of the lenses D and D' but having a substantially lower Abbe number. It follows from what has already been said that the radii of curvature of the surfaces $R_1$, $R_5$ and $R_{10}$ are identical. The powers of the doublets 20 and 21 are negative for the reason set forth above.

The term split cube is used herein in an illustrative sense to refer to any two-part body of refractive material having an index of refraction different from air and wherein the plane of juncture between the two parts constitutes a partial reflecting surface regardless of the shape of the non-operative surface area of the body.

The constructional data for one example of a successful embodiment illustrated in the drawings and which was reduced to practice is as shown in the table below. The radius, thickness and distance values are dimensionless and indicate relative proportions. These relative values are given in terms of elements for use with an optical system, such as a camera objective having focal length of unity or greater. The letter R with the appropriate subscriptions designates the incident and emergent boundary surfaces of the lens elements in terms of their respective radii of curvature. The index of refraction, $n_D$, is for sodium light and surfaces designated by the same subscriptions are contiguous.

| Components | Radius: Incident—Emergent | Index for Refraction $n_D$ | Abbe Number | Thickness |
|---|---|---|---|---|
| A | $R_1 = +2.2700$ | 1.71715 | 29.5 | 0.02084 |
|   | $R_2 = \infty$ |   |   |   |
| BC Split Cube | $R_3 = \infty$ | 1.71288 | 53.51 | 0.4749 |
|   | $R_4 = \infty, R_9 = \infty$ |   |   |   |
| D | $R_4 = \infty$ | 1.71288 | 53.51 | 0.0120 |
|   | $R_5 = +2.2700$ |   |   |   |
| Air Space E |  | Air |  | 0.0201 |
| F | $R_6 = \infty$ | 1.77670 | 44.69 | 0.06006 |
|   | $R_7 = -0.539$ |   |   |   |
| G | $R_7 = -0.539$ | 1.54031 | 50.90 | 0.0201 |
|   | $R_8 = +1.400$ |   |   |   |
| D' | $R_9 = \infty$ | 1.71288 | 53.51 | 0.0120 |
|   | $R_{10} = +2.2700$ |   |   |   |
| Air Space E' |  | Air |  | 0.0201 |
| F' | $R_6' = \infty$ | 1.77670 | 44.69 | 0.06006 |
|   | $R_7' = -0.539$ |   |   |   |
| G' | $R_7' = -0.539$ | 1.54031 | 50.90 | 0.0201 |
|   | $R_8' = +1.400$ |   |   |   |

P = 0.782

What is claimed is:

1. An optical beam-splitting system comprising, two right triangular wedges assembled in juxtaposed relation to form a split cube having an incident light surface and two emergent light surfaces, said incident surface and one of said emergent surfaces being coaxially aligned, said incident and emergent surfaces being convex toward the incident light and all having the same radius of curvature, a negative lens adjacent and coaxial with each of the respective emergent surfaces, the negative powers of said respective lenses being between −0.1 and −0.4 diopters, to cancel the positive astigmatism resulting from the curvature of said incident and emergent surfaces.

2. In combination in an optical system, an objective light collecting system, a plurality of image receiving devices, an optical beam-splitter optically between said objective and said image receiving devices, said beam-splitter comprising, two right triangular wedges assembled in juxtaposed relation to form a split cube having an incident surface and two emergent surfaces, said incident surface and one of said emergent surfaces being coaxially aligned, said incident and both emergent surfaces being convex toward the incident light and all having the same radius of curvature, a negative lens between the respective emergent surfaces and said image receiving devices, said negative lenses being coaxial, respectively, with said emergent surfaces and the powers of said negative lenses being between —0.1 and —0.4 diopters, to cancel the positive astigmatism resulting from the curvature of said incident and said respective emergent surfaces.

3. An optical beam-splitter system comprising, a split cube made of two right triangular sections with their hypotenuses in intimate light transmitting relation with a partially light reflecting substance on the plane of juncture between said sections, a plano-convex lens element cemented to one face of said cube with its convex surface constituting the incident light surface, a plano-concave lens element cemented to the opposite side of said cube with its apex toward the incident light and optically coaxial with said plano-convex lens element, a second plano-concave lens element cemented to another face of said cube with its apex toward said plane of juncture between said sections, said concave surfaces serving as the emergent light surfaces, the radii of curvature of said concave emergent surfaces being the same as the radius of curvature of said convex incident surface, a negative lens adjacent and coaxial with each of the respective emergent surfaces, the negative powers of said respective lenses being between —0.1 and —0.4 diopters, to cancel the positive astigmatism resulting from the curvature of said incident and emergent surfaces.

4. An optical beam-splitting system comprising, a split cube made of two right triangular prism sections with their hypotenuses in intimate light transmitting relation with a partially light reflecting substance on the plane of juncture between said sections, said cube having an incident light convex surface and two emergent concave surfaces, one of said concave surfaces having its apex toward said plane of juncture, said other surfaces having their apices toward the incident light, the radii of curvature of said surfaces being identical and being of such value as to substantially eliminate spherical aberration although introducing astigmatism correctable by low power negative lenses, and identical doublets adjacent said respective emergent surfaces, each of said doublets consisting of a plano-convex member and a double concave member, the powers of said doublets being between —0.1 and —0.4 diopters, and the dispersive indices of the elements of said doublets being substantially balanced to substantially eliminate chromatic aberration.

5. An optical beam-splitting system comprising, a split cube made of two right triangular prism sections B and C with their hypotenuses in intimate light transmitting relation with a partially light reflecting substance on the plane of juncture between said sections, a lens component A contiguous with the component B of the split cube and positioned opposite the hypotenuse of component B, a lens component D contiguous with the component C of the split cube and positioned opposite the hypotenuse of component C and opposite component A, a lens component F spaced from component D by an air space E, a lens component G contiguous with said component F, a lens component D' contiguous with the component B of the split cube and positioned opposite the hypotenuse of component B and at right angles with components A and D, a lens component F' spaced from component D' by an air space E', and a lens component G' contiguous with said component F' said components having in addition the properties set forth in the chart below:

| Components | Radius: Incident—Emergent | Index for Refraction $n_D$ | Abbe Number | Thickness |
|---|---|---|---|---|
| A | $R_1 = +2.2700$ <br> $R_2 = \infty$ | 1.71715 | 29.5 | 0.02084 |
| BC Split Cube | $R_2 = \infty$ <br> $R_4 = \infty, R_9 = \infty$ | 1.71288 | 53.51 | 0.4749 |
| D | $R_4 = \infty$ <br> $R_5 = +2.2700$ | 1.71288 | 53.51 | 0.0120 |
| Air Space E | | Air | | 0.0201 |
| F | $R_6 = \infty$ <br> $R_7 = -0.539$ | 1.77670 | 44.69 | 0.06006 |
| G | $R_7 = -0.539$ <br> $R_8 = +1.400$ | 1.54031 | 50.90 | 0.0201 |
| D' | $R_9 = \infty$ <br> $R_{10} = +2.2700$ | 1.71288 | 53.51 | 0.0120 |
| Air Space E' | | Air | | 0.0201 |
| F' | $R_6' = \infty$ <br> $R_7' = -0.539$ | 1.77670 | 44.69 | 0.06006 |
| G' | $R_7' = -0.539$ <br> $R_8' = +1.400$ | 1.54031 | 50.90 | 0.0201 |

Where R, with the appropriate subscriptions, designates the incident and emergent boundary surfaces of the lens elements in terms of their respective radii of curvature, $n_D$ is the index of refraction for sodium light and surfaces designated by the same subscription are contiguous.

References Cited in the file of this patent

UNITED STATES PATENTS

| | | |
|---|---|---|
| 1,280,667 | Comstock | Oct. 8, 1918 |
| 1,668,015 | Harris | May 1, 1928 |
| 2,053,224 | Reason | Sept. 1, 1936 |
| 2,178,245 | Schwarz | Oct. 31, 1939 |
| 2,600,590 | Thomas | June 17, 1952 |
| 2,672,072 | Sachtleben et al. | Mar. 16, 1954 |

FOREIGN PATENTS

| | | |
|---|---|---|
| 362,482 | Germany | Oct. 29, 1922 |
| 606,896 | France | Mar. 20, 1926 |
| 775,060 | France | Oct. 1, 1934 |